United States Patent [19]

Guimbal et al.

[11] Patent Number: 5,249,925
[45] Date of Patent: Oct. 5, 1993

[54] VARIABLE-PITCH MULTI-BLADE ROTOR, IN PARTICULAR FOR THE REAR ANTI-TORQUE SYSTEM OF A ROTATING WING AIRCRAFT

[75] Inventors: Bruno Guimbal, Les Milles; Jean-Pierre Jalaguier, Vitrolles, both of France

[73] Assignee: Aerospatiale Societe Nationale Industrielle, Paris, France

[21] Appl. No.: 972,640

[22] Filed: Nov. 6, 1992

[30] Foreign Application Priority Data

Dec. 2, 1991 [FR] France .................. 91 14893

[51] Int. Cl.⁵ .............................. B64C 11/06
[52] U.S. Cl. ................. 416/134 A; 416/136; 416/138; 416/168 R
[58] Field of Search .............. 416/134 R, 134 A, 135, 416/136, 138, 168 R

[56] References Cited

U.S. PATENT DOCUMENTS

| | | | |
|---|---|---|---|
| 3,006,417 | 10/1961 | Busquet | 416/168 R |
| 3,594,097 | 7/1971 | Moville et al. | 416/134 A |
| 4,281,966 | 8/1981 | Duret et al. | 416/168 R |
| 4,555,219 | 11/1985 | Jeffrey et al. | |
| 4,626,172 | 12/1986 | Moville et al. | 416/134 A |

FOREIGN PATENT DOCUMENTS

| | | |
|---|---|---|
| 904931 | 7/1949 | Fed. Rep. of Germany . |
| 1531536 | 5/1967 | France . |
| 2542695 | 7/1985 | France . |
| 1114934 | 5/1968 | United Kingdom . |

Primary Examiner—Edward K. Look
Assistant Examiner—Christopher Verdier
Attorney, Agent, or Firm—Fisher, Christen & Sabol

[57] ABSTRACT

A variable-pitch multi-blade rotor for use as the anti-torque rear rotor of a rotating wing aircraft has a rotor with a central shaft rotated about a central axis, a hub constrained to rotate with the central shaft about the central axis, blades distributed around the central axis with each blade being connected to the central shaft by a twistable element, a pitch control disk for the blades which is constrained to rotate with the central shaft but free to slide axially relative to the central shaft, and a member for controlling the sliding of the pitch control disk along the central shaft. Each blade root is secured to a transverse thrust and pitch control lever forming a yoke having one end hinged to the hub and another end hinged to the pitch control disk.

12 Claims, 6 Drawing Sheets

VARIABLE-PITCH MULTI-BLADE ROTOR, IN PARTICULAR FOR THE REAR ANTI-TORQUE SYSTEM OF A ROTATING WING AIRCRAFT

The present invention relates to a variable-pitch multi-blade rotor, intended in particular for use as the faired-type anti-torque rear rotor for a rotating wing aircraft.

BACKGROUND OF THE INVENTION

Document FR-A-2 542 695 describes a variable-pitch multi-blade rotor of this type, comprising:

a central shaft rotated about a central axis;

a hub constrained to rotate with the central shaft about said central axis;

blades distributed around said central axis and each connected to said central shaft by a twistable element;

a pitch control disk for said blades, said disk being constrained to rotate with said central shaft but being free to slide axially relative thereto; and means for controlling the sliding of said pitch control disk along said central shaft.

In that known multi-blade rotor, each blade is provided with a cylindrical blade root mounted in bearings provided in said hub and engaged by the pitch-control disk. The cylindrical blade root is made, for example, of light alloy and its bearing surfaces that engage the bearings must receive hard coatings, e.g. of chromium oxide. Furthermore, since the blade itself is generally made of a composite material, e.g. based on carbon fibers, it is necessary to provide a conical flare at one end of said blade serving to secure it in said blade root. As a result the cost of such a known multi-blade rotor is high.

An object of the present invention is to remedy that drawback and to provide a variable-pitch multi-blade rotor of reduced cost and of reduced mass, including a small number of parts, such that it becomes economically feasible to use such a rotor on a light helicopter.

SUMMARY OF THE INVENTION

To this end, according to the invention, the above-specified variable-pitch multi-blade rotor is remarkable in that the root of each blade is secured to a transverse thrust and pitch control lever forming a yoke having one end hinged to said hub and having its other end hinged to said pitch control disk.

Thus, by controlling the axial sliding of said pitch control disk, the pitch of a blade is varied, the blade being capable of pivoting about the hinge between the end of the lever and the hub.

Advantageously, in order to obtain flat blade roots, the longitudinal dimension of said lever is at least approximately parallel to the chord of the associated blade. Said lever may be a part added to the blade or it may form an integral portion thereof. A blade and/or its control and thrust lever may be made of composite material or of metal. When said lever is added to the blade, it is advantageous for said lever to be an angle-section member, with one of the flanges of the angle section serving to hinge the lever to the hub and to the pitch control disk, with the other flange of the angle section serving for fixing the lever to the blade root.

Preferably, both said hub and said pitch control disk are in the form of respective concave shells, with the concave sides of said shells facing each other and with said levers being hinged to the facing edges of said shells. Such a disposition enables the hub and the pitch control disk to form an assembly that is closed about the axial zone of the mechanism, thereby reducing the flow of air between the blades due to centrifugal pumping and thus reducing aerodynamic losses. To facilitate manufacture of the hinge plates of the levers, it is advantageous for the edges of said shells to have plate-forming teeth disposed in such a manner that the teeth of one of the shells engage between the teeth of the other, and for each lever to be hinged between a plate of one of the shells and a plate of the other shell.

Advantageously, the leading edge of each blade is on the same side as the hinge between its lever and the pitch control disk. In this way, the thrust of the blade provides assistance in increasing blade pitch, such that the force required for pitch control is small. It is then unnecessary to provide pitch servo-control.

In an advantageous disposition, the hinge between said lever and the pitch control disk lies in front (relative to the direction of rotation of the rotor) of the leading edge of the blade, and the hinge between said lever and the hub likewise lies in front of the trailing edge of the blade.

As described in Document FR-A-2 542 695, the twistable element connecting each blade to the central shaft may be formed by a radial twistable bundle (e.g. made of metal or of strong fibers), optionally forming a longitudinal strength member for said blade. However, in the present case, said radial twistable bundle passes between the two hinges of the lever respectively with the hub and with the pitch control disk, and it can therefore no longer be disposed to coincide with the pitch axis, such that it is advantageous for the purpose of connecting said twistable bundles to one another on said central shaft to provide a ring that takes up the centrifugal forces from all of the blades and that is suitable for sliding axially on said central shaft so that the connections between the twistable bundles and said ring can follow the displacements of the blade roots along axes parallel to the central axis during changes in blade pitch control.

It may be observed that since the two hinges of a lever are disposed on either side of the twistable bundle, it is possible to obtain a considerable lever arm for controlling pitch, thereby further reducing control forces.

The hinges between a lever and respectively the hub and the pitch control disk may each include a ball. However, when it is required that the blades should have great stiffness against flapping, it is possible, at least for the hinge between the lever and the hub, to provide secure fixing by means of a pair of bearings having an axis that extends transversely to said central axis.

BRIEF DESCRIPTION OF THE DRAWINGS

Embodiments of the invention are described by way of example with reference to the accompanying drawings, in which.

DETAILED DESCRIPTION

Figure 1:
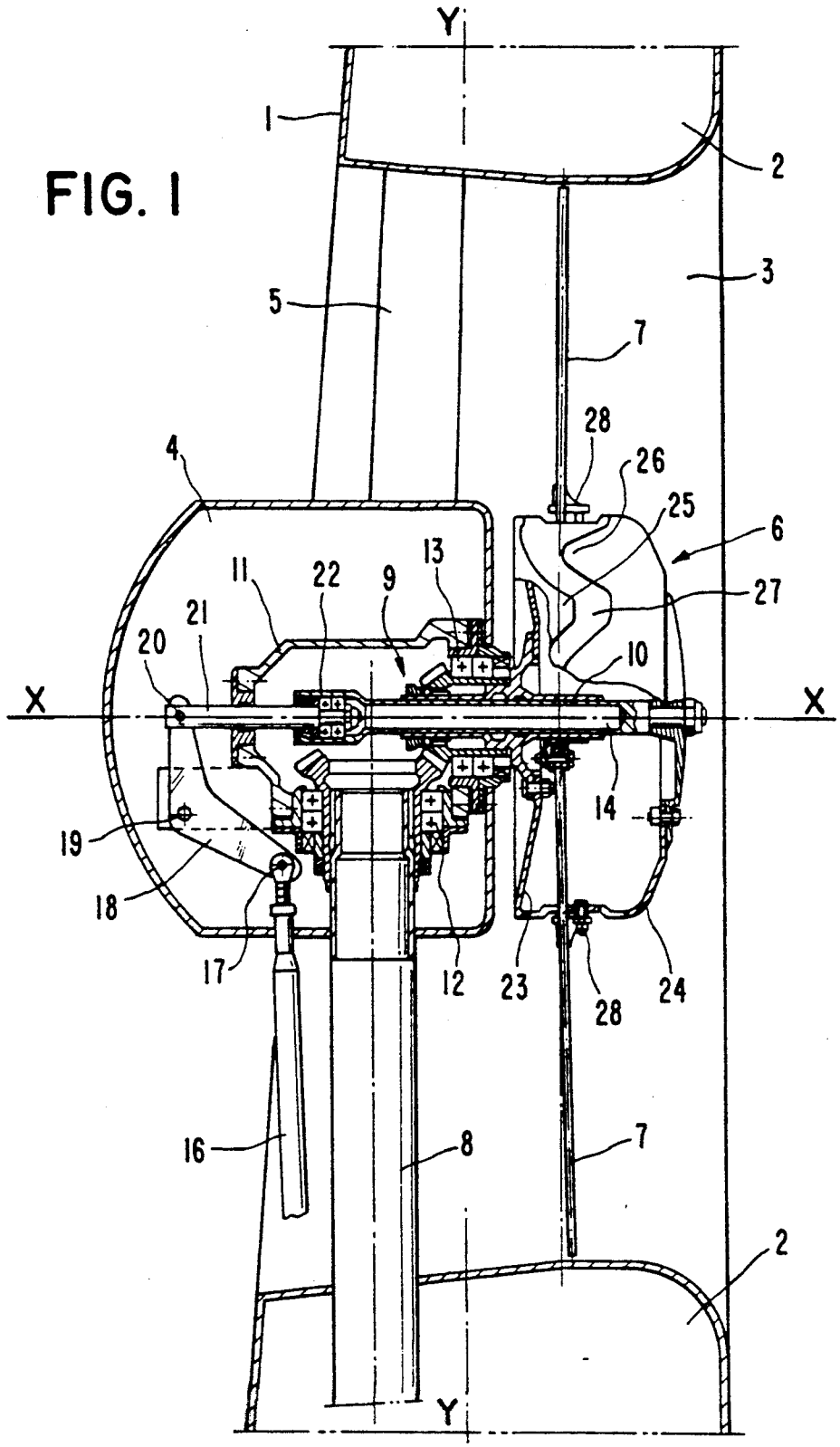
FIG. 1 is an axial section through a faired-rotor helicopter anti-torque system in accordance with the present invention.

The helicopter anti-torque system shown in FIG. 1 is disposed in the usual manner close to the end of the tail 1 of said helicopter. It includes a fairing 2 that delimits a cylindrical tunnel 3 whose axis X-X extends transversely to the longitudinal axis Y-Y of the helicopter. A rear transmission box 4 is mounted in the tunnel 3 and is held coaxially about the axis X-X by support arms 5. The rear transmission box 4 itself carries a rotor 6 provided with a plurality of radial blades 7, the axis of said rotor 6 coinciding with the axis X-X.

In usual manner, the rear transmission box 4 is connected to a main transmission box (not shown but disposed in the vicinity of the helicopter engine(s)) by means of a rotary drive shaft 8 which is at least substantially parallel to the longitudinal axis Y-Y. An angle take-off gear 9 enables the rotary drive shaft 8 to rotate the shaft 10 (about the axis X-X) of the rotor 6.

Naturally, as shown in FIG. 1, the shafts 8 and 10 are mounted in the case 11 of the rear transmission box 4 by means of ball bearings 12 and 13.

In addition, the shaft 10 of the rotor 6 is hollow and it has a pitch control rod 14 extending longitudinally therealong (on the axis X-X), e.g. connected to the shaft 10 by a longitudinal fluting system 15 (see also FIG. 2), such that the pitch control rod 14 is constrained to rotate with the shaft 10, but is free to slide relative thereto parallel to the axis X-X.

To control the sliding of the pitch control rod 14, the anti-torque system includes a control link 16 hinged at 17 to a bell crank 18, itself pivoting at 19 on the case 11 of the rear transmission box 4. The other end of the bell crank 18 is hinged at 20 to a rod 21 which is guided to slide along said axis X-X so that said rod 21 can slide along said axis under drive from the bell crank 18. A bearing system 22 connects the rod 21 slidably to the control rod 14, but does not allow them to rotate relative to each other.

Figure 2:
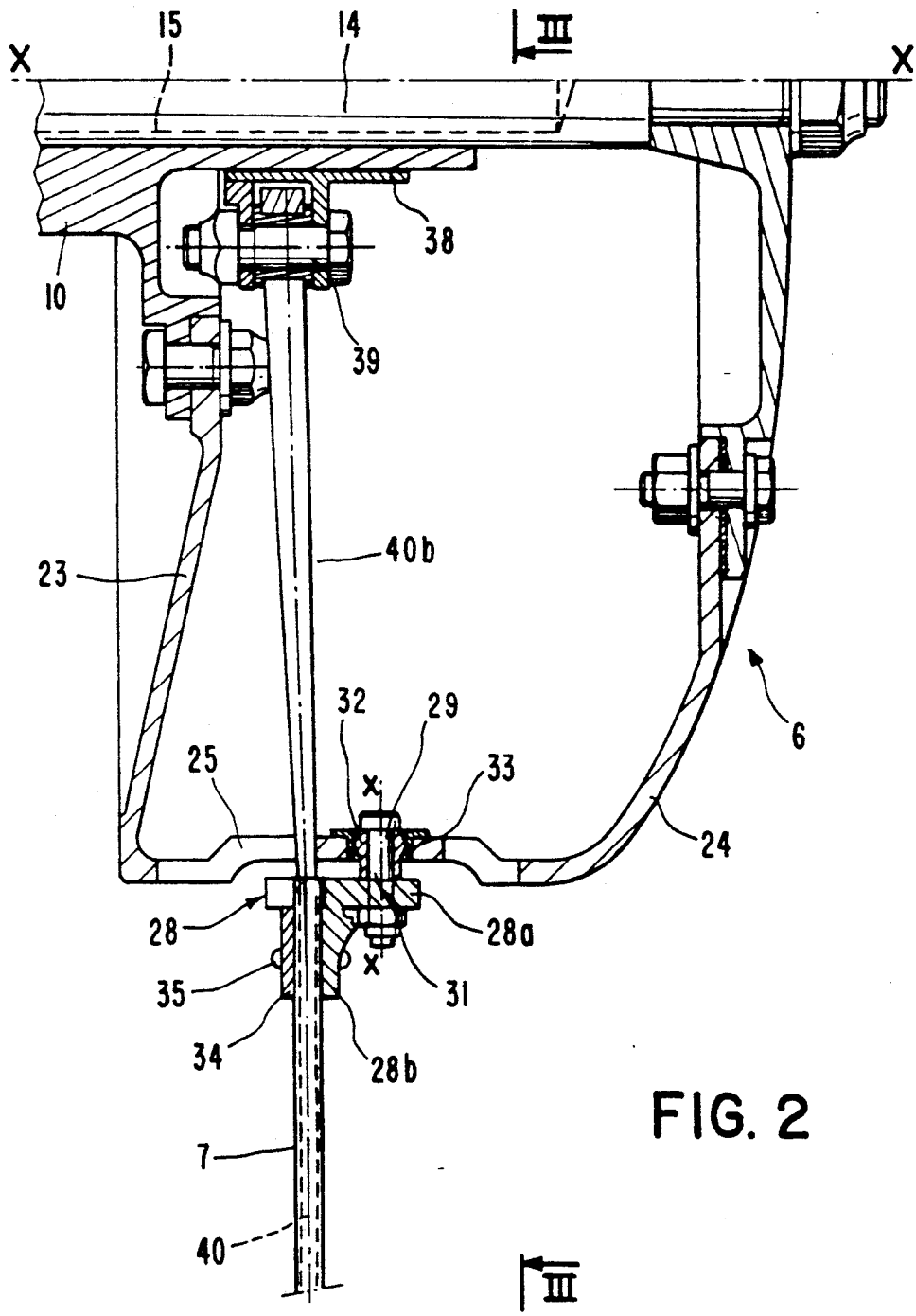
FIG. 2 is an axial half-section on a larger scale through the rotor of the anti-torque system of FIG. 1, on line II—II of FIG. 3.
Figure 3:
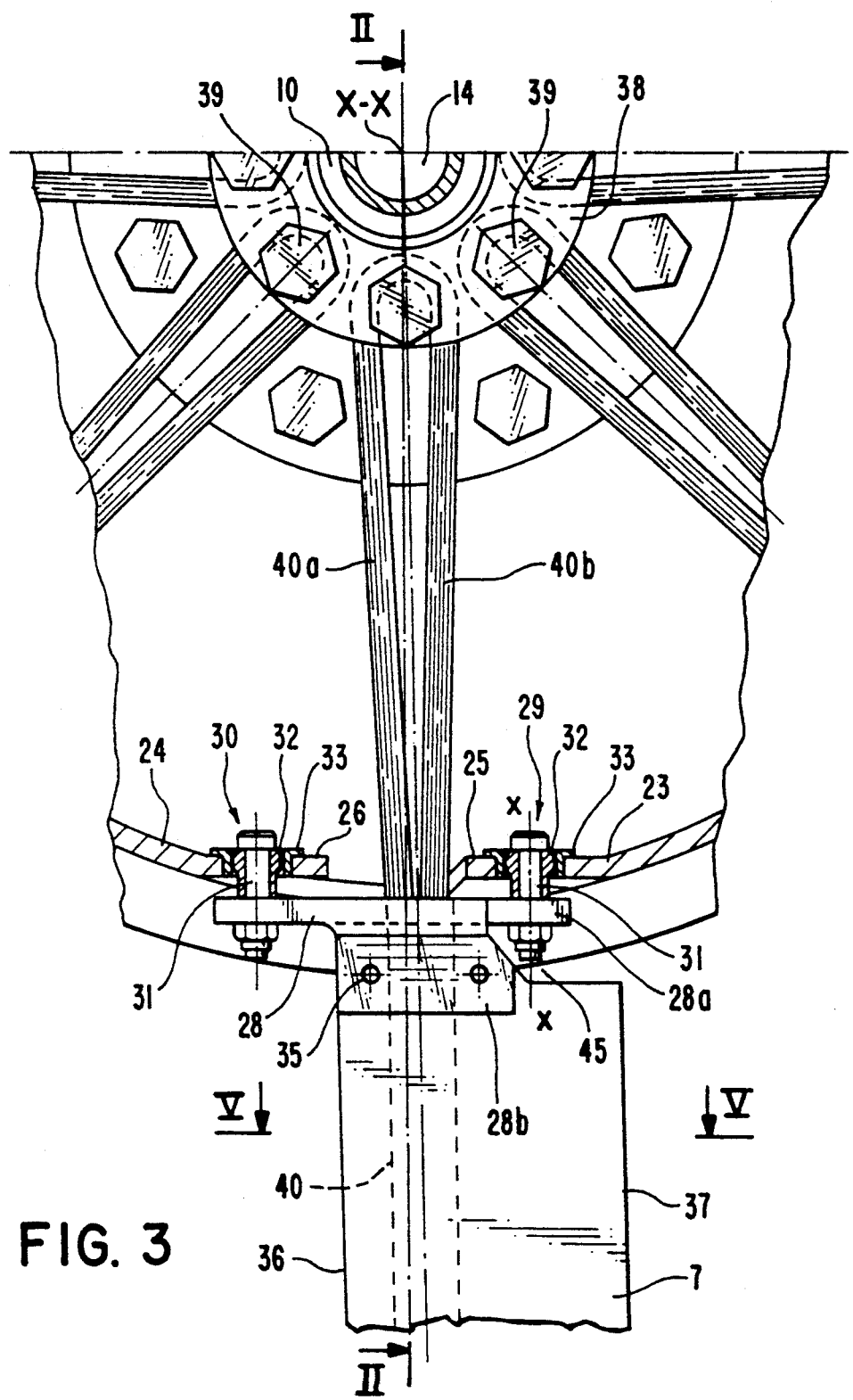
FIG. 3 is a fragmentary section on line III—III of FIG. 2.
Figure 4:
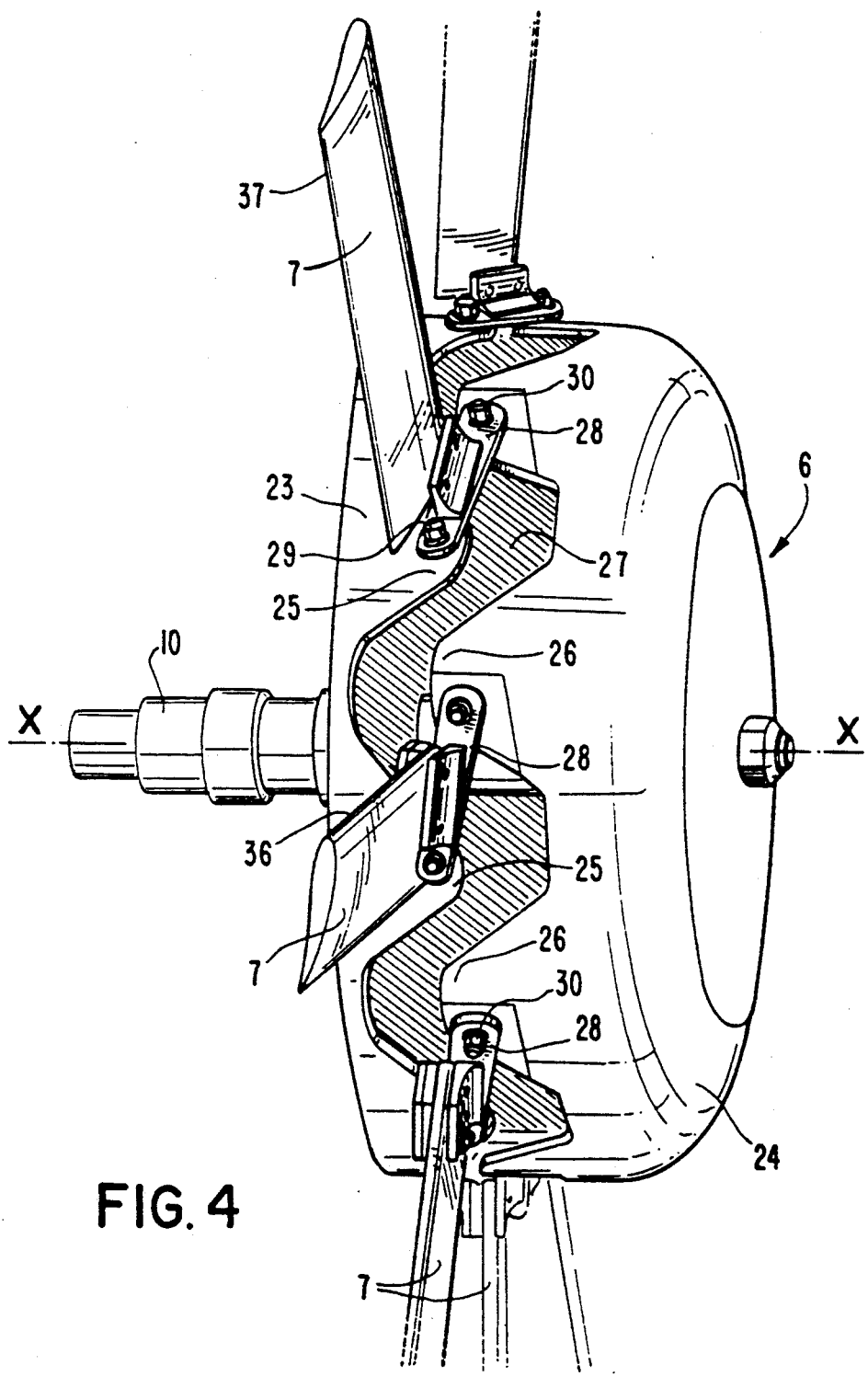
FIG. 4 is a perspective view of the rotor of the anti-torque system of FIGS. 1 to 3.
Figure 5:
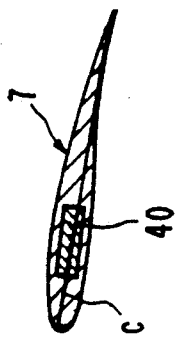
FIG. 5 is a cross-section through a blade on line V—V of FIG. 3.

As shown on a larger scale in FIGS. 2 to 4, a hub 23 in the form of a concave shell is provided on the shaft 10 of the rotor 6. In addition, a pitch control disk 24, likewise in the form of a concave shell, is fixed to the free end of the pitch control rod 14. The concave side of the hub 23 faces the concave side of the pitch control disk 24. In addition, the facing edges of the hub 23 and of the pitch control disk 24 are provided with respective teeth 25 and 26 disposed in such a manner that each tooth 25 lies between two teeth 26, and vice versa, such that a circular zig-zag slot 27 is left empty between the hub 23 and the pitch control disk 24 (see in particular FIG. 4 and the simplified top portion of the rotor 6 that is not in section in FIG. 1).

The root of each blade 7 is integral with or is fixed to an angle section lever 28. One of the flanges 28a of the lever 28 has one end hinged by means of a hinge 29 about an axis x-x that extends transversely to the axis X-X, to a plate formed by one of the teeth 25 of the hub 23, while the other end of the same flange 28a is hinged by a hinge 30 whose axis extends transversely to the axis X-X, to a plate formed by the following tooth 26 of the pitch control disk 24.

Each of the hinges 29 and 30 comprises a ball 32 (e.g. made of carbide) having a bolt 31 passing therethrough along an axis which is orthogonal to said flange 28a. Each of the balls 32 is engaged in a cylindrical sleeve 33 housed in a bore formed in the thickness of the corresponding tooth 25 or 26.

In the example shown in FIGS. 2 and 3, the other flange 28b of the lever 28 is used for fixing to the root of the blade 7 by means of a backing plate 36 and through-fasteners 35. The leading edge 36 of the blade 7 is adjacent to the hinge 30 with the pitch control disk 24, while the trailing edge 37 of the blade 7 is disposed adjacent to the hinge 29 with the hub 23. The longitudinal dimension of the flange 28a of the lever 28 extends at least substantially parallel to the chord C of the profile of the blade 7.

In addition, a sliding ring 38 is mounted on the rotary shaft 10, the ring having pins 39 whose axes are parallel to the axis X-X.

Each blade 7 is connected to a corresponding pin 39 by means of a radial twistable bundle 40. Such a twistable bundle passes between the hinges 29 and 30 and may constitute a longitudinal strength member for the blade 7. In the vicinity of a pin 39, each twistable bundle 40 splits into two strands 40a and 40b so as to form a loop passing round the corresponding pin 39.

Each twistable bundle 40 thus serves to hold the corresponding blade 7 against centrifugal force. In contrast, the thrust and the drag of each blade are taken up by the two balls 32 at the ends of its lever 28.

As can be seen in FIG. 3, the two balls 32 are disposed respectively in front of the leading edge 36 and in front of the trailing edge 37 of the blade 7. To this end, the blade 7 may include a notch 45 in its trailing edge in the vicinity of its root.

It can thus be seen, that by virtue of the above dispositions, the distance between the axes of the two balls 32 which corresponds to the pitch control lever arm for the blade can be selected to have any desired value.

Figure 6:
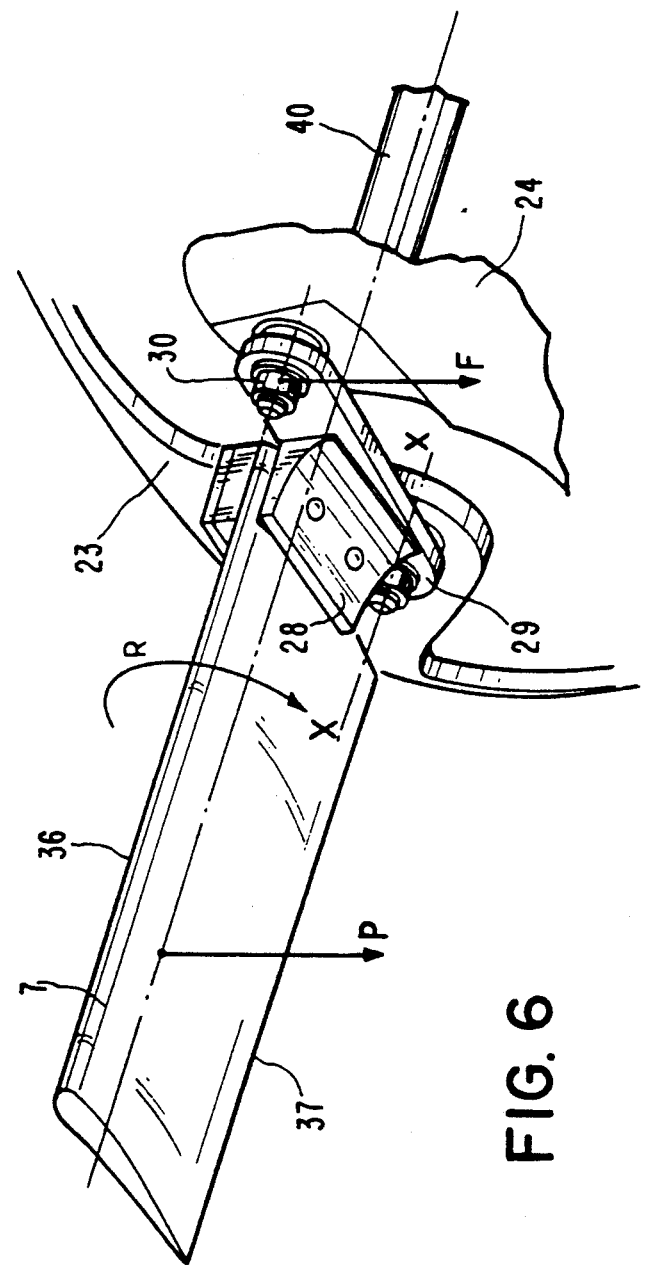
FIG. 6 is a perspective view showing the thrust and the hinging of a blade on the hub and on the control disk.

When the link 16 is pulled towards the front of the helicopter, the bell crank 18 and the rod 21 cause the rod 14 to be pushed to the right in FIG. 1 such that the pitch control disk 24 is moved away from the hub 23 (see arrow F in FIG. 6). As a result the levers 28 and the blades 7 swivel in the increasing pitch direction (see arrow R in FIG. 6), against the return torque exerted by the twistable bundles 40, said swivelling taking place about the axes x-x of the ball 32 of each of the hinges 29 between a lever 28 and the hub 23.

It will be observed that:

the distance between the axes of the two balls 32 of a blade 7 (the lever arm) can be selected to have any desired value, and said distance can be designed to be large enough for the control forces applied to the disk 24 to be small and for the stroke of the rod 21 to be large enough to overcome the effects of slack;

since the system does not include any cylindrical bearings for the roots of the blades, friction is practically zero; and the axis of pitch rotation x-x of a blade 7 is far behind the aerodynamic focus (e.g. by 70% of the chord). Consequently, the lift P exerts a large amount of torque on the blade 7 in the same direction as the pitch control (see FIG. 6).

The control force F is thus small and there is no need to provide servo-control for controlling pitch.

Figure 7:
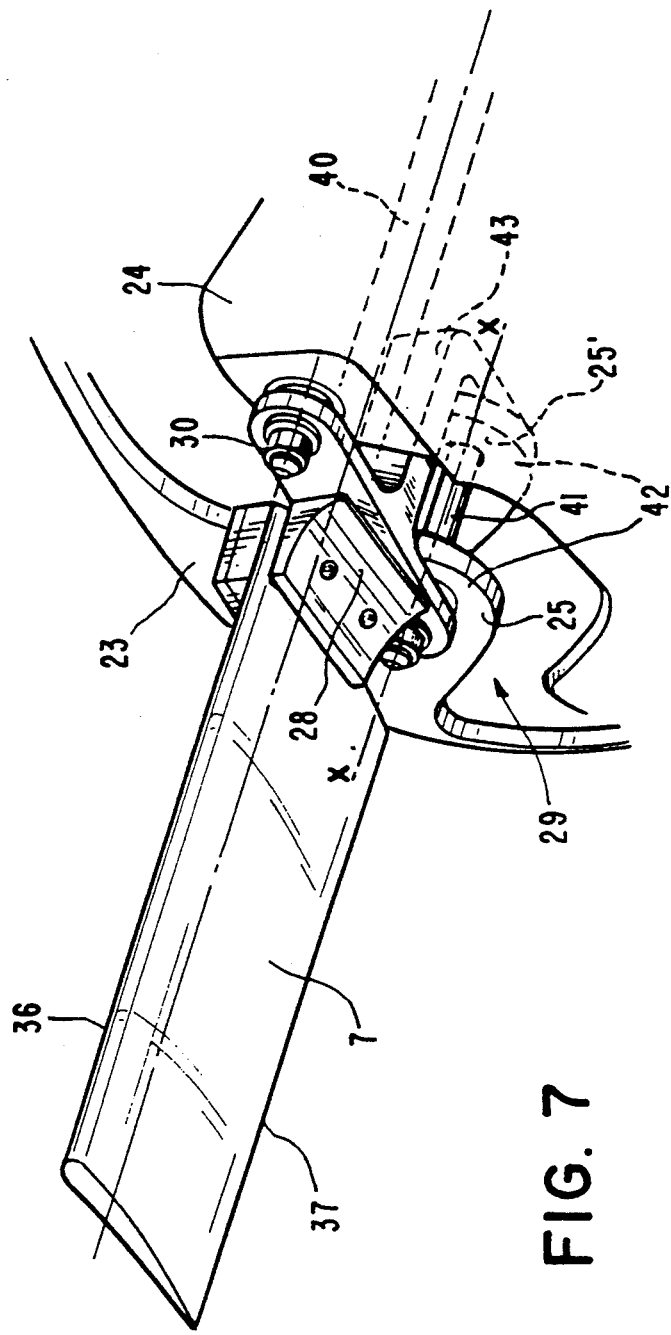
FIG. 7 is a view similar to FIG. 6 showing a variant of the thrust and the hinging of a blade on the hub.

In the variant of FIG. 7, the hinge 30 between the lever 28 and the pitch control disk 24 is similar to that described above. In contrast, the hinge 29 between the lever 28 and the hub 23 has a different structure which imparts greater stiffness against flapping to the blade 7. To this end, the hinge 29 of FIG. 7 has a hinge pin 41 which is held in a fork 42 made up of a tooth 25 and a parallel tooth 25', both of which are integral with the hub 23. Furthermore, the lever 28 includes a bracket 43 that co-operates with the trailing edge end of the flange 28a of said lever 28 to form another fork, which fork is likewise hinged about said pin 41.

The blades 7 may be made of metal. In which case it is advantageous for the levers 28 to be integral with the blades.

The blades 7 may easily be made of a fiber-resin composite material. It should then be observed that the flat shape of said blades (no cylindrical blade roots) greatly simplifies blade manufacturing operations. All the blades 7 can be molded together with their twistable bundles 40 in a single operation in a plane two-part mold.

We claim:

1. A variable-pitch multi-blade rotor particularly intended for use as an anti-torque rear rotor of a rotating wing aircraft, the rotor being of the type comprising:
   a central shaft rotated about a central axis;
   a hub constrained to rotate with the central shaft about said central axis;
   blades distributed around said central axis and each connected to said central shaft by a twistable element;
   a pitch control disk for said blades, said disk being constrained to rotate with said central shaft but being free to slide axially relative thereto; and
   means for controlling the sliding of said pitch control disk along said central shaft;
   wherein the root of each blade is secured to a transverse thrust and pitch control lever forming a yoke having one end hinged to said hub and having another end hinged to said pitch control disk.

2. A rotor according to claim 1, wherein a longitudinal dimension of said lever is at least approximately parallel to a chord of a respective blade.

3. A rotor according to claim 1, wherein said lever forms an integral portion of a respective blade.

4. A rotor according to claim 1, wherein said lever is added to a respective blade.

5. A rotor according to claim 4, wherein said lever is an angle-section member, with one the flange of the angle section serving to hinge the lever to the hub and to the pitch control disk, and with another flange of the angle section serving for fixing the lever to a respective blade.

6. A rotor according to claim 1, wherein both said hub and said pitch control disk are in form of respective concave shells, with the concave sides of said shells facing each other and with said levers being hinged to the facing edges of said shells.

7. A rotor according to claim 6, wherein the facing edges of said shells have teeth disposed in such a manner that the teeth of one of the shells engage between the teeth of the other, and wherein each lever is hinged between a tooth of one of the shells and a tooth of the other shell.

8. A rotor according to claim 1, wherein the leading edge of each blade is on the same side as a hinge between its lever and the pitch control disk.

9. A rotor according to claim 8, wherein the hinge between the lever and the pitch control disk lies in front of the leading edge of the blade, and wherein the hinge between the lever and a hub lies in front of a respective trailing edge of the blade.

10. A rotor according to claim 1, in which the twistable element connecting each blade to the central shaft is formed by a radial twistable bundle, and to connect said twistable bundles to the said central shaft, the rotor includes a ring suitable for sliding axially along the shaft.

11. A rotor according to claim 1, wherein the hinges between the lever and the hub and the level and the pitch control disk include respective balls.

12. A rotor according to claim 1, wherein at least the hinge between the lever and the hub includes a stationary pin having an axis that extends transversely to said central axis.

* * * * *